United States Patent
Togashi (10) Patent No.: US 6,661,640 B2
(45) Date of Patent: Dec. 9, 2003

(54) MULTILAYER CERAMIC ELECTRONIC DEVICE

(75) Inventor: Masaaki Togashi, Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 10/207,066

(22) Filed: Jul. 30, 2002

(65) Prior Publication Data
US 2003/0026059 A1 Feb. 6, 2003

(30) Foreign Application Priority Data
Aug. 3, 2001 (JP) .................................. 2001-236807

(51) Int. Cl.[7] .................. H01G 4/228; H01G 4/005; H01G 4/06
(52) U.S. Cl. .................. 361/306.3; 361/303; 361/311
(58) Field of Search ................. 361/301.2–301.4, 361/303, 304, 306.1–306.3, 307, 308.1, 309, 311–313, 320, 321.1–321.5

(56) References Cited

U.S. PATENT DOCUMENTS

| | | | | | |
|---|---|---|---|---|---|
| 3,740,624 A | * | 6/1973 | McAdams et al. | ....... | 361/321.3 |
| 4,658,328 A | * | 4/1987 | Sakabe | ....... | 361/309 |
| 5,880,925 A | | 3/1999 | DuPre et al. | | |
| 6,091,598 A | * | 7/2000 | Kobayashi | ....... | 361/303 |
| 6,385,034 B2 | * | 5/2002 | Tanaka | ....... | 361/306.3 |

FOREIGN PATENT DOCUMENTS

| | | | | |
|---|---|---|---|---|
| GB | 2032689 A | * 5/1980 | ............ | H01G/4/30 |
| JP | A 11-144996 | 5/1999 | | |
| JP | P2000-195750 | * 7/2000 | ............ | H01G/4/30 |

* cited by examiner

Primary Examiner—Dean A. Reichard
Assistant Examiner—Eric Thomas
(74) Attorney, Agent, or Firm—Oliff & Berridge, PLC (57) ABSTRACT

A multilayer ceramic electronic device having a dielectric body formed by stacking a plurality of dielectric sheets. Two types of internal electrodes are alternately arranged inside the dielectric body via dielectric sheets. Each internal electrode is formed with a lead part led out straddling three side surfaces of the dielectric body. Two terminal electrodes are arranged at outer surfaces of the dielectric body. Each terminal electrode is arranged at the outer surface of the dielectric body straddling three side surfaces of the dielectric body, is connected to either of the two types of internal conductors, and is insulated from the other. In this multilayer ceramic electronic device, the ESL can be greatly reduced. This multilayer ceramic electronic device is used for example as a decoupling capacitor.

11 Claims, 9 Drawing Sheets

ESL·di/dt

MULTILAYER CERAMIC ELECTRONIC DEVICE

BACKGROUND OF THE INVENTION

1. Field of the Invention

The present invention relates to a multilayer ceramic electronic device greatly reducing the equivalent serial inductance (ESL), more particularly relates to a multilayer ceramic electronic device suitable for a multilayer ceramic capacitor used as a decoupling capacitor.

2. Description of the Related Art

In recent years, while advances have been made in reducing the voltage of power sources used for supplying power to large-scale integrated circuits (LSI's) and other integrated circuits, the load current has increased.

Figure 8:
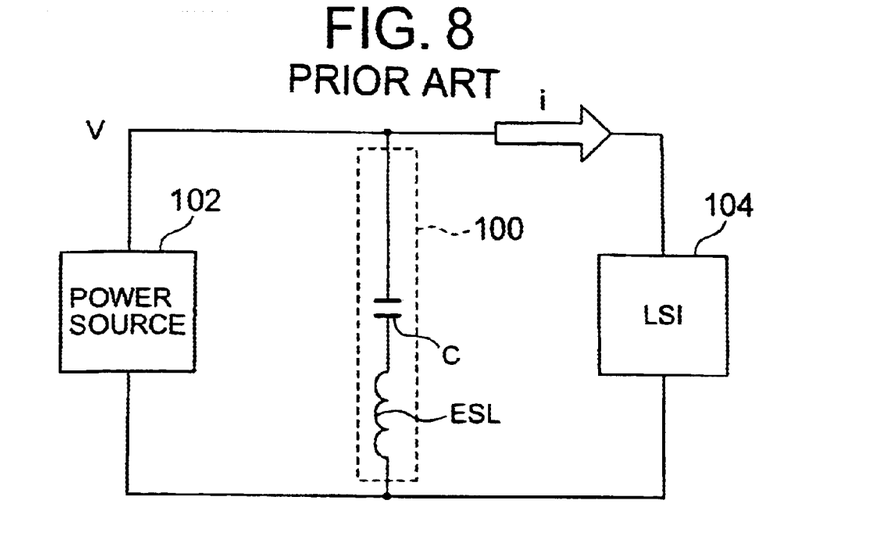
FIG. 8 is a diagram of a circuit including a multilayer ceramic capacitor.

Therefore, it has become extremely difficult to keep fluctuations in the power source voltage to within tolerances when faced with sharp changes in the load current. Therefore, as shown in FIG. 8, a for example two-terminal structure multilayer ceramic capacitor 100 called a "decoupling capacitor" is now being connected to a power source 102. At the time of transitory fluctuation in the load current, current is supplied from this multilayer ceramic capacitor 100 to the LSI 104 of the central processing unit (CPU) etc. to suppress fluctuation of the power source voltage.

Along with the increasingly higher operating frequencies of today's CPU's, however, the fluctuations in the load current have become faster and larger. The ESL of the multilayer ceramic capacitor 100 itself, shown in FIG. 8, now has a great impact on fluctuations of the power source voltage.

Figure 9:
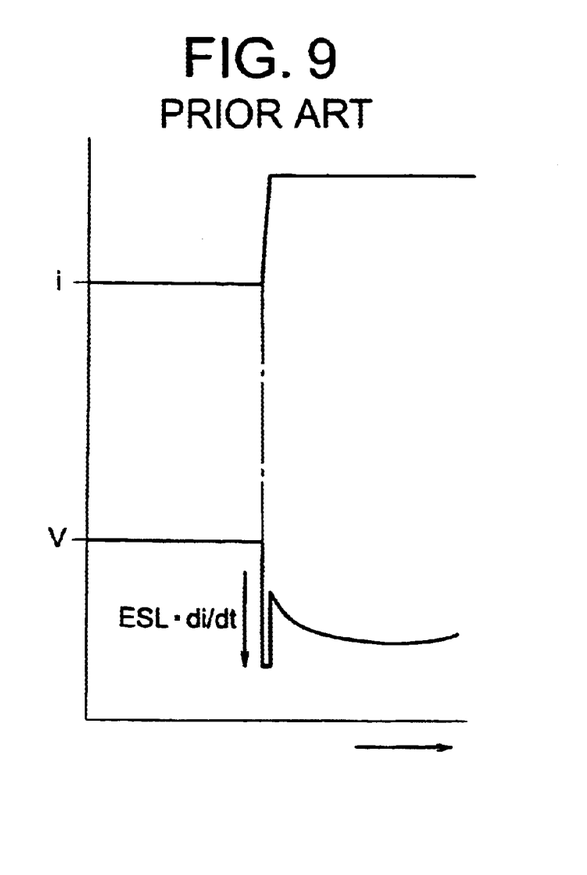
FIG. 9 is a graph of the relationship between a load current and power source voltage in the circuit shown in FIG. 8.

That is, in a conventional multilayer ceramic capacitor 100, since the ESL is high, fluctuation of the power source voltage V easily becomes greater in the same way as above along with fluctuations in the load current i shown in FIG. 9.

This is because the fluctuations in voltage at the time of transition of the load current are approximated by the following equation 1 and therefore the level of the ESL is related to the magnitude of fluctuation of the power source voltage. Further, from equation 1, reduction in the ESL can be said to be linked with stabilization of the power source voltage.

$$dV = ESL \cdot di/dt \qquad (1)$$

where,
   dV is transitory fluctuation of voltage (V),
   i is the fluctuation of current (A), and
   t is the time of fluctuation (sec).

Figure 10:
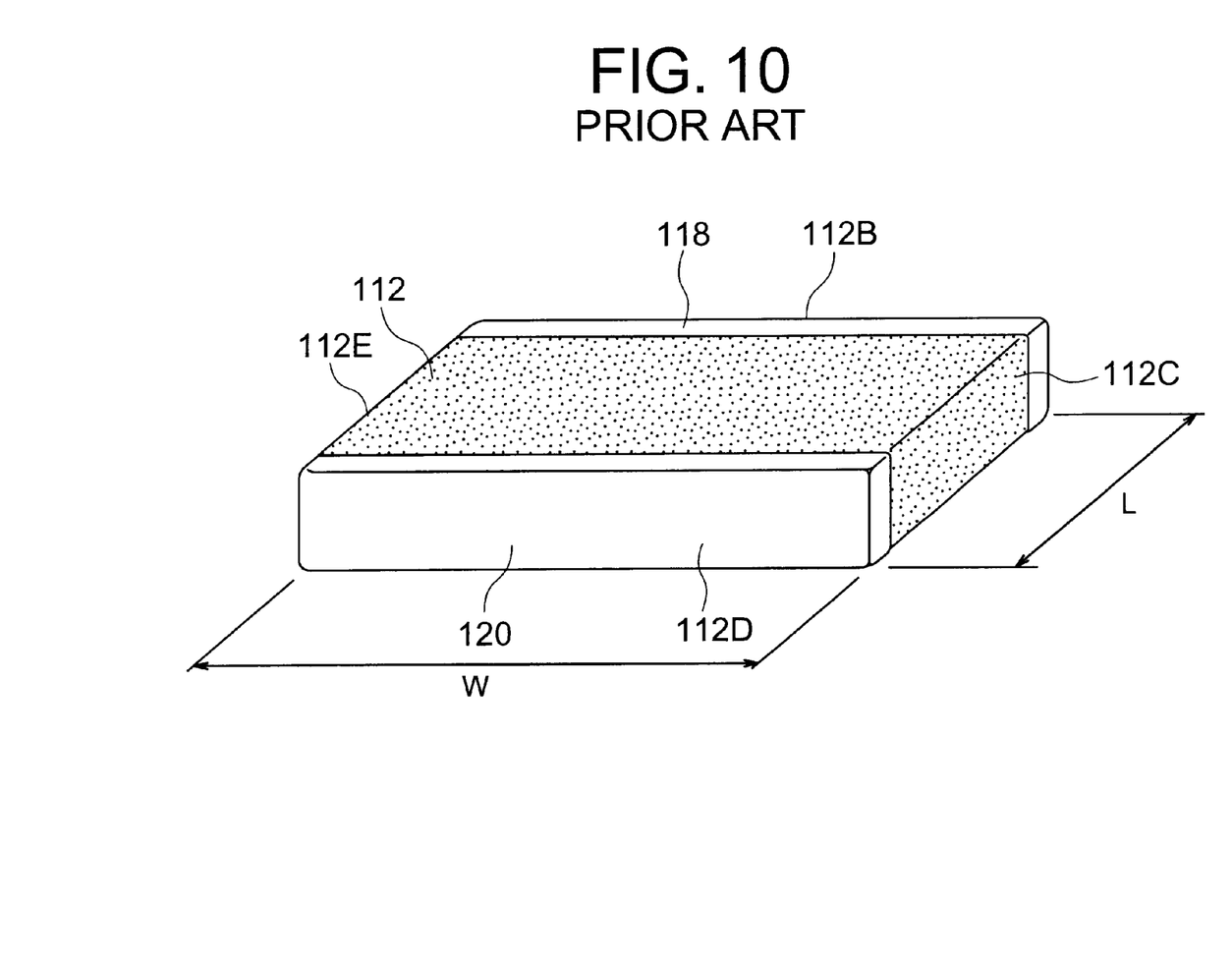
FIG. 10 is a perspective view of a multilayer capacitor according to an example of the prior art.
Figure 11A:
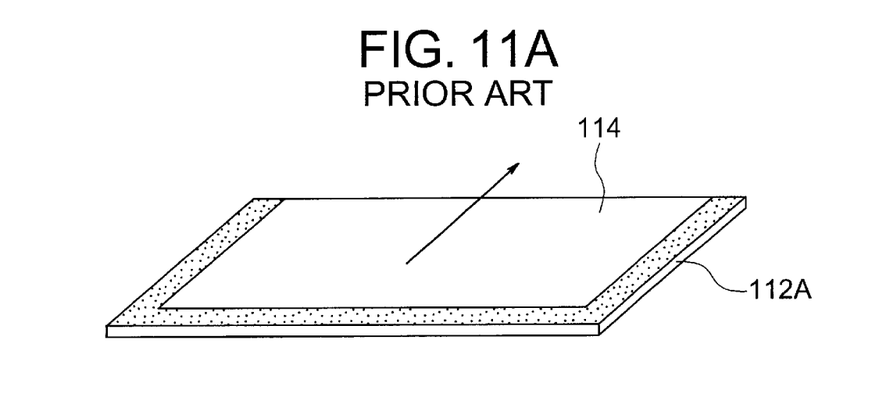
FIG. 11A is a perspective view of one internal conductor present at the inside of the capacitor shown in FIG. 10.
Figure 11B:
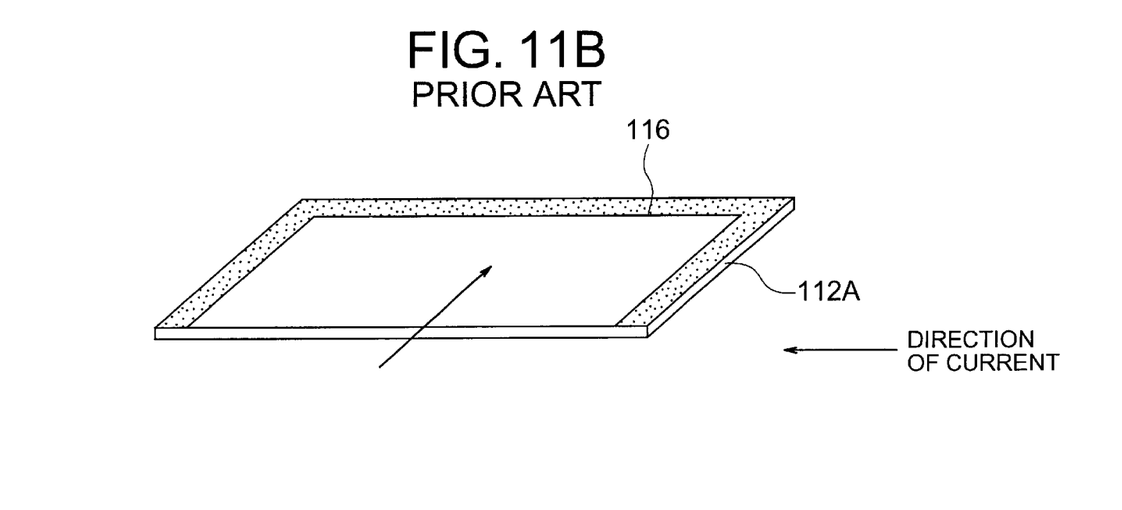
FIG. 11B is a perspective view of another internal conductor present at the inside of the capacitor shown in FIG. 10.

FIG. 10 shows a conventional multilayer ceramic capacitor. In this capacitor, ceramic layers 112A provided with two types of internal conductors 114 and 116 shown in FIG. 11A and FIG. 11B are alternately stacked to form a dielectric body 112. These internal conductors 114 and 116 are formed in a manner led out to the two facing side surfaces 112B and 112D of the dielectric body 112.

Further, in a multilayer ceramic capacitor of such a structure, as a general technique for reducing the ESL, as shown in FIG. 10, a structure setting the ratio of dimensions between a dimension L and dimension W of the external dimensions of the multilayer ceramic capacitor to L/W<0.75 has been proposed. In this structure, the path of the current is shortened and the inductance of the internal conductors 114 and 116 is reduced by placing terminal electrodes 118 and 120 at the large area side surfaces 112B and 112D. In this structure, however, there are limits in the production and mounting of the multilayer ceramic capacitor and the inductance cannot be sufficiently reduced.

Note that here, the "dimension L" is the distance between the side surfaces 112B. and 112D of the dielectric body 112 to which the two types of internal conductors 114 and 116 are led out, while the "dimension W" is the distance between the side surfaces 112C and 112E orthogonal to the side surfaces 112B and 112D of the dielectric body 112 to which the internal conductors 114 and 116 are led out.

SUMMARY OF THE INVENTION

An object of the present invention is to provide a multilayer ceramic electronic device able to greatly reduce the ESL.

To attain the above object, there is provided a multilayer ceramic electronic device comprising a dielectric body formed by stacking a plurality of dielectric sheets; two types of internal conductors arranged inside the dielectric body sandwiched between the dielectric sheets, formed with lead parts led out straddling three side surfaces of the dielectric body, and interposed between different layers; and two terminal electrodes each arranged at an outer surface of the dielectric body straddling three side surfaces of the dielectric body, connected to one of the two types of internal conductors, and insulated from the other.

According to the multilayer ceramic electronic device of the present invention, two types of internal conductors are alternately arranged in the dielectric body formed by stacking a plurality of dielectric sheets in a manner sandwiched between the dielectric sheets. These two types of internal conductors are led out straddling three side surfaces of the dielectric body. Further, two terminal electrodes are arranged at the outside of the dielectric body straddling three side surfaces of the dielectric body. Each of these two terminal electrodes is connected to one of the two types of internal conductors.

Therefore, by the connection of the two terminal electrodes and two types of internal conductors straddling the three side surfaces of the dielectric body, there are locations in the two types of internal conductors where current flows in reverse directions.

Therefore, an action arises canceling out the magnetic field at the locations where the current flows in reverse directions. Along with this, the effects arise that the parasitic inductance of the multilayer electronic device itself can be reduced and the ESL is reduced.

That is, according to the multilayer ceramic electronic device according to the present invention, a great reduction in the ESL of the multilayer ceramic electronic device is achieved, fluctuation of the power source voltage can be suppressed, and a device suitable for use as a decoupling capacitor can be obtained.

Preferably, lead parts of the two types of internal conductors led out to the side surfaces of the dielectric body are arranged straddling three side surfaces of the dielectric body in a positional relationship not overlapping when projected in a stacking direction of the dielectric sheets.

In this case, the two terminal electrodes can be reliably arranged at the outside of the dielectric body straddling three side surfaces of the dielectric body without short-circuiting with each other.

Preferably, the dielectric body is formed shaped as a rectangular parallelopiped. By making the dielectric body a rectangular parallelopiped in shape, the dielectric body can be easily made and the productivity improved.

Preferably, each of the internal conductors has an internal conductor body portion having a shape matching an outer shape of the dielectric sheet and separated from edges of the dielectric sheet and a lead part formed integrally with the internal conductor body portion on the same plane and led out straddling adjoining three side surfaces of the dielectric body.

Preferably, pluralities of the two types of internal conductors are arranged in the dielectric body.

Preferably, the two types of internal conductors are alternately arranged in the dielectric body.

By arranging pluralities of the two types of internal conductors in the dielectric body, not only does the electrostatic capacity become higher, but also the action of canceling out the magnetic field becomes further greater, the inductance is more greatly reduced, and the ESL is further reduced.

Preferably, lead parts of the internal conductors are arranged straddling a short side surface of the rectangular parallelopiped shaped dielectric body and two long side surfaces positioned at the two sides of the short side surface.

Preferably, matching with the led out shapes of the lead parts of the internal conductors, the terminal electrodes are arranged straddling a short side surface of the rectangular parallelopiped shaped dielectric body and the two long side surfaces positioned at the two sides of the short side surface.

Preferably, lead parts of the internal conductors are arranged straddling a long side surface of the rectangular parallelopiped shaped dielectric body and the two short side surfaces positioned at the two sides of the long side surface.

Preferably, matching with the led out shapes of the lead parts of the internal conductors, the terminal electrodes are arranged straddling a long side surface of the rectangular parallelopiped shaped dielectric body and the two short side surfaces positioned at the two sides of the long side surface.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

First Embodiment

Figure 1:
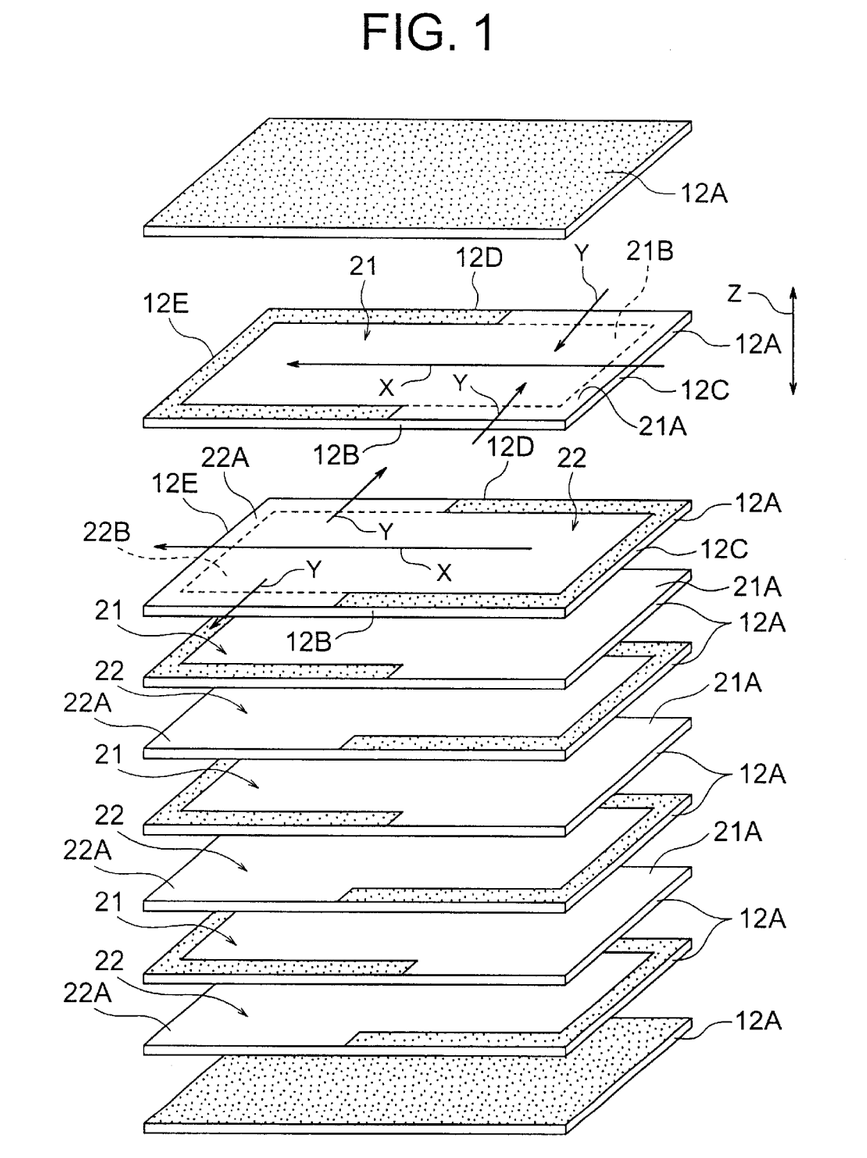
FIG. 1 is a disassembled perspective view of a multilayer capacitor according to an embodiment of the present invention.
Figure 2:
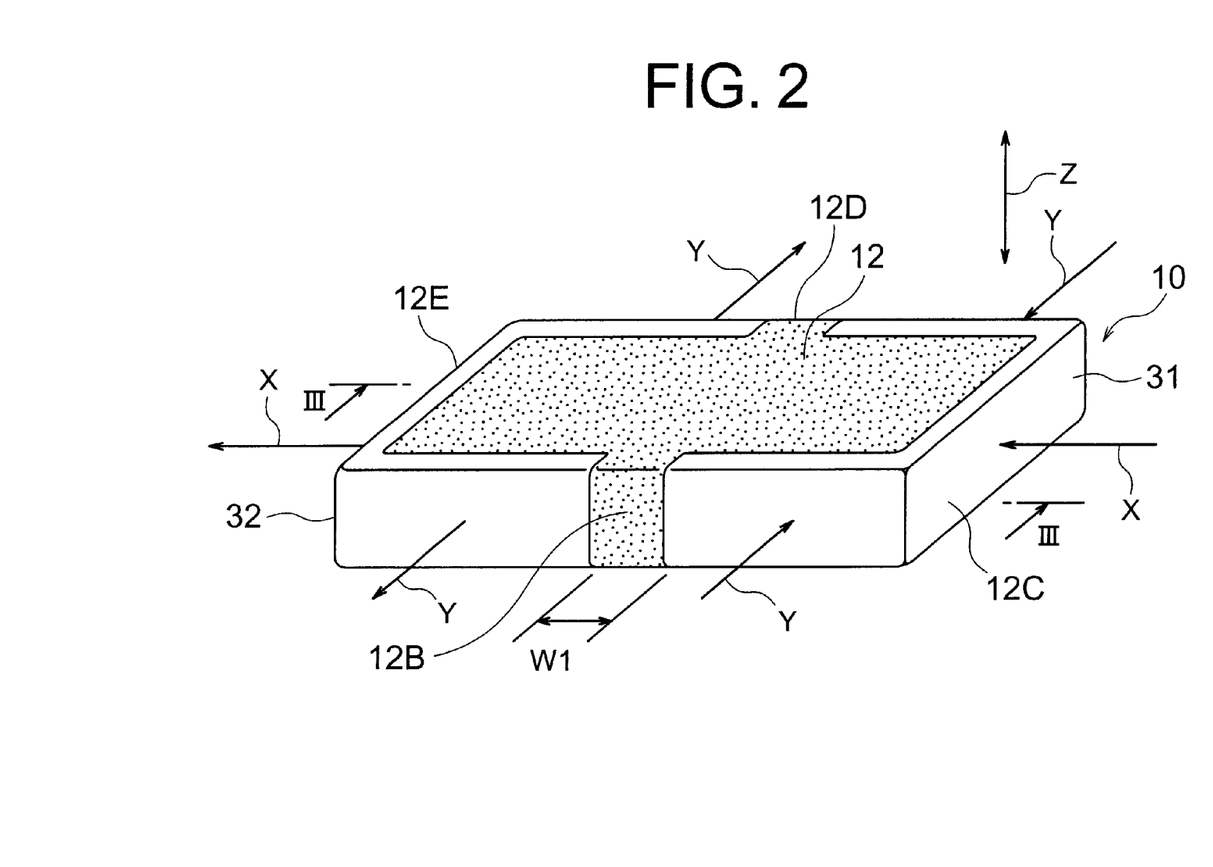
FIG. 2 is a perspective view of the multilayer capacitor shown in FIG. 1.
Figure 3:
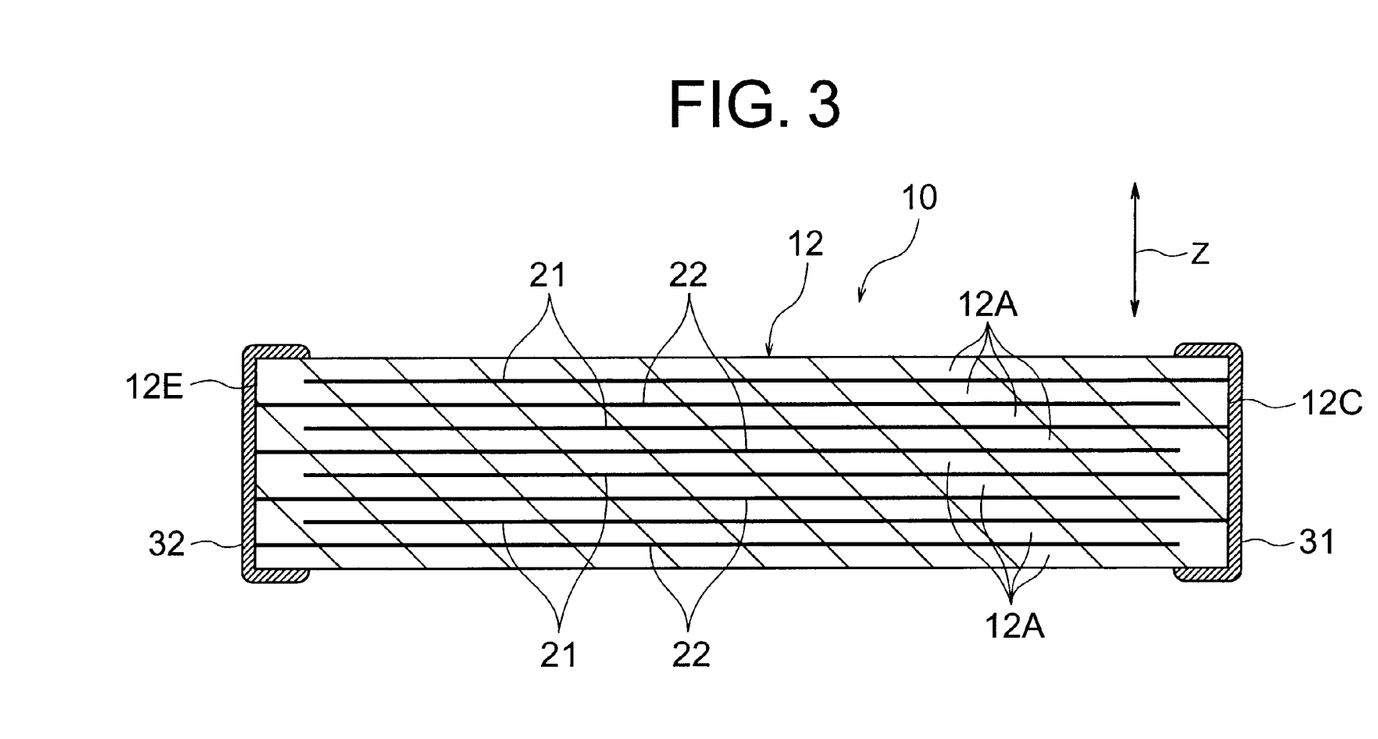
FIG. 3 is a sectional view of the multilayer capacitor shown in FIG. 2 along the line III—III.

A multilayer ceramic capacitor (hereinafter simply referred to as a "multilayer capacitor") 10 of the present embodiment, corresponding to the multilayer ceramic electronic device according to the present invention, is shown in FIG. 1 to FIG. 3. As shown in these figures, the multilayer ceramic capacitor 10 has as its main part a dielectric body 12 comprised of a rectangular parallelopiped shaped sintered body obtained by sintering a stack of a plurality of dielectric sheets, that is, ceramic green sheets.

This dielectric body 12 has arranged inside it a first type of internal conductors extending thinly along a long direction X of the dielectric body 12, that is, the internal electrodes 21, and a second type of internal conductors extending thinly along the long direction X of the dielectric body 12, that is, the internal electrodes 22. Further, pluralities of (in the figure, a total of eight of) these internal electrodes 21 and internal electrodes 22 are arranged so as to alternate between adjoining layers as shown in FIG. 1 and FIG. 3. The ceramic layers 12A are arranged between these internal electrodes 21 and internal electrodes 22.

That is, in this embodiment, four each of the internal electrodes 21 and 22 are alternately arranged in the dielectric body 12 in a manner sandwiched between the sintered dielectric sheets, that is, the ceramic layers 12A. As the material of these internal electrodes 21 and 22, not only may base metal materials such as nickel, nickel alloy, copper, or copper alloy be considered, but also materials having these metals as main ingredients may be considered.

As shown in FIG. 1, each internal electrode 21 has an internal conductor body portion 21B having a shape matching with the outer shape of the ceramic layer 12A and separated from the surrounding edges of the ceramic layer 12A. This internal conductor body portion 21B is the portion forming one electrode of the capacitor. The internal conductor 21 further has a lead part 21A formed integrally with the internal conductor body portion 21B on the same plane and led out straddling the adjoining three side surfaces 12C, 12B, and 12D of the dielectric body 12.

Among these three side surfaces, the side surface 12C is a short side surface, while the side surfaces 12D and 12B positioned at the two sides are long side surfaces. The lead part 21A is only formed up to the somewhat right side portion from the center of the side surfaces 12B and 12D in the X direction at the two long side surfaces 12B and 12D.

Further, the other internal electrode 22 has an internal conductor body portion 22B having a shape matching the outer shape of the ceramic layer 12A and separated from the surrounding edges of the ceramic layer 12A. This internal conductor body portion 22B is the portion forming the other electrode of the capacitor. The internal electrode 22 further has a lead part 22A formed integrally with the internal conductor body portion 22B on the same plane and led out straddling the adjoining three side surfaces 12E, 12B, and 12D of the dielectric body 12.

Among these three side surfaces, the side surface 12E is a short side surface facing the short side surface 12C, while the side surfaces 12D and 12B positioned at the two sides are long side surfaces. The lead part 22A is only formed up to the somewhat left side portion from the center of the side surfaces 12B and 12D in the X direction at the two long side surfaces 12B and 12D of the dielectric body 12.

Therefore, the lead parts 21A and 22A formed at the two types of internal electrodes 21 and 22 are arranged straddling the adjoining three side surfaces of the dielectric body 12 in positional relationships not overlapping when projected in the stacking direction Z of the ceramic layers 12A.

Terminal electrodes 31 and 32 are formed at the outside of the dielectric body 12 as shown in FIG. 2 and FIG. 3 corresponding to the shapes of the lead parts 21A and 22A and connected to the same. That is, the terminal electrode 31 is arranged at the outside of the dielectric body 12 in a manner straddling the three side surfaces 12B, 12C, and 12D of the dielectric body 12, while the terminal electrode 32 is arranged at the outside of the dielectric body 12 in a manner straddling the three side surfaces 12B, 12D, and 12E of the dielectric body 12.

Further, these pairs of terminal electrodes 31 and 32 are separated from each other by the width W1 along the X direction at the facing long side surfaces 12B and 12D of the body 12 so as to be insulated from each other. The width W1 is substantially the same as the width of non-overlap of the lead parts 21A and 22B and preferably is 0.3 to 0.5 mm.

In this way, in the present embodiment, the internal electrodes 21 and 22 form facing electrodes of the capacitor. The terminal electrode 31 connected to the internal electrodes 21 is arranged near the right side in the illustration of the multilayer capacitor 10, while the terminal electrode 32 connected to the internal electrodes 22 is arranged near the left side of the multilayer capacitor 10.

Therefore, the multilayer capacitor 10 according to the present embodiment is a two-terminal structure multilayer capacitor where terminal electrodes 31 and 32 are arranged at all of the four side surfaces 12B to 12E of the dielectric body 12 made a rectangular parallelopiped shape.

Next, the action of the multilayer capacitor 10 according to the present embodiment will be explained.

According to the multilayer capacitor 10 of this embodiment, two types of internal electrodes 21 and 22 are alternately arranged in a dielectric body 12 formed into a rectangular parallelopiped shape by stacking a plurality of dielectric sheets in a manner sandwiched between dielectric sheets. These two types of internal electrodes 21 and 22 are arranged in a positional relationship not overlapping when projected in the stacking direction of the dielectric sheets and are led out straddling three side surfaces of the dielectric body 12. Further, the two terminal electrodes 31 and 32 are arranged at the outside of the dielectric body 12 straddling three side surfaces of the dielectric body 12. These two terminal electrodes 31 and 32 are connected to either of the two types of internal electrodes 21 and 22.

Therefore, in the two types of internal electrodes 21 and 22, in addition to the main flow of current shown by the arrow X in FIG. 1, there are locations where a reverse current arises shown by the arrow Y.

Therefore, an action arises canceling out the magnetic field at the locations where the current flows in reverse directions and along with this the effects arise that the parasitic inductance of the multilayer capacitor 10 itself can be reduced and the ESL is reduced.

Due to the above, according to the multilayer capacitor 10 of the present embodiment, a great reduction in the ESL of the multilayer capacitor 10 is achieved, fluctuation of the power source voltage can be suppressed, and the capacitor can be suitably used as a decoupling capacitor.

Further, by arranging pluralities of the two types of internal electrodes 21 and 22 in the dielectric body 12, not only does the electrostatic capacitance rise, but also the action canceling out the magnetic field becomes greater, the inductance is more greatly reduced, and the ESL is reduced further in the multilayer capacitor 10.

When producing the multilayer capacitor 10 according to the present embodiment, by stacking the dielectric sheets formed into a rectangle or other quadrilateral shape, it is possible to form the dielectric body 12 as a rectangular parallelopiped shape. As a result, the productivity of the capacitor is improved.

Further, by forming the lead parts 21A and 22A in a positional relationship so as not to overlap when projected in the stacking direction of the dielectric sheets as in this embodiment, two terminal electrodes 31 and 32 can be reliably arranged at the outside of the dielectric body 12 straddling three side surfaces of the dielectric body 12 without short-circuiting with each other.

Second Embodiment

Next, a second embodiment of the present invention will be explained with reference to FIG. 4 and FIG. 5. Further, members the same as the members explained in the first embodiment are assigned the same reference numerals and overlapping explanations are omitted.

Figure 4:
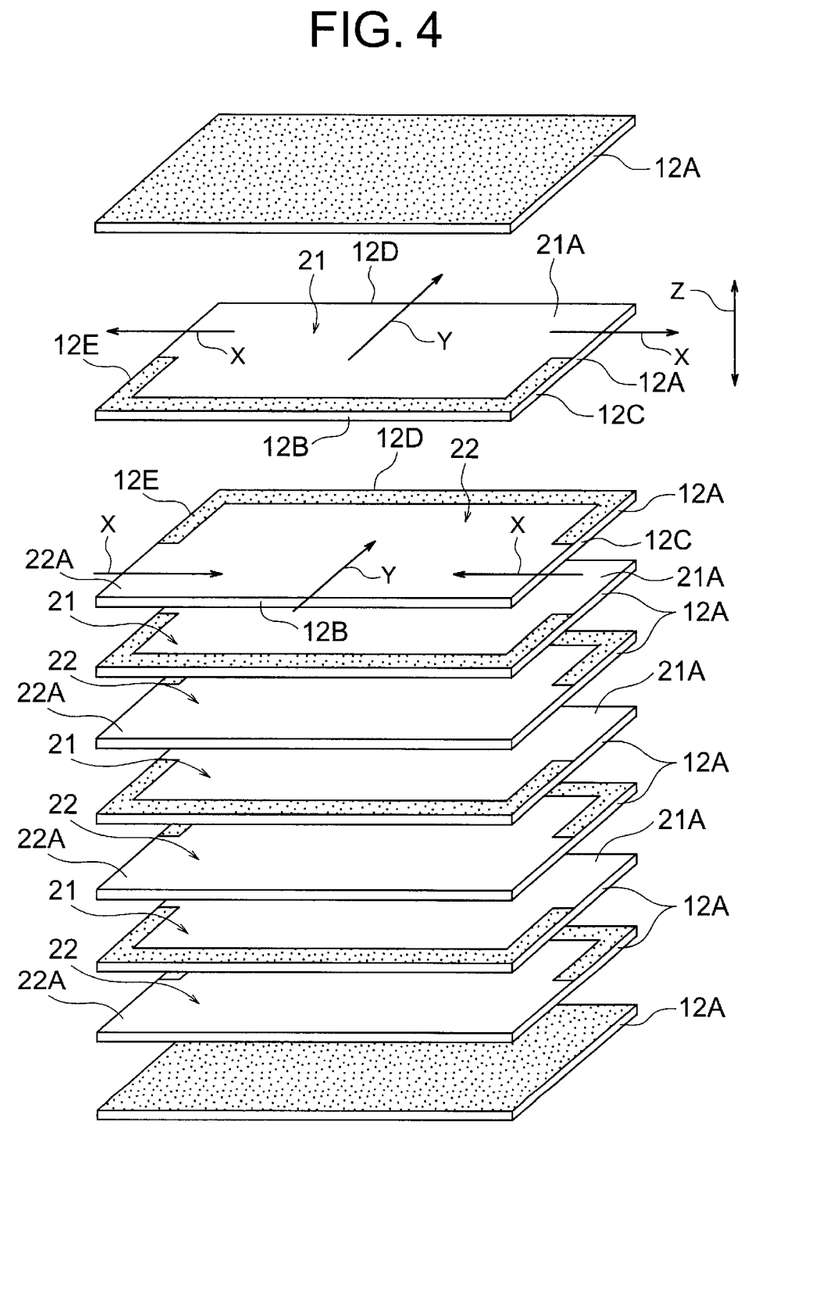
FIG. 4 is a disassembled perspective view of a multilayer capacitor according to another embodiment of the present invention.
Figure 5:
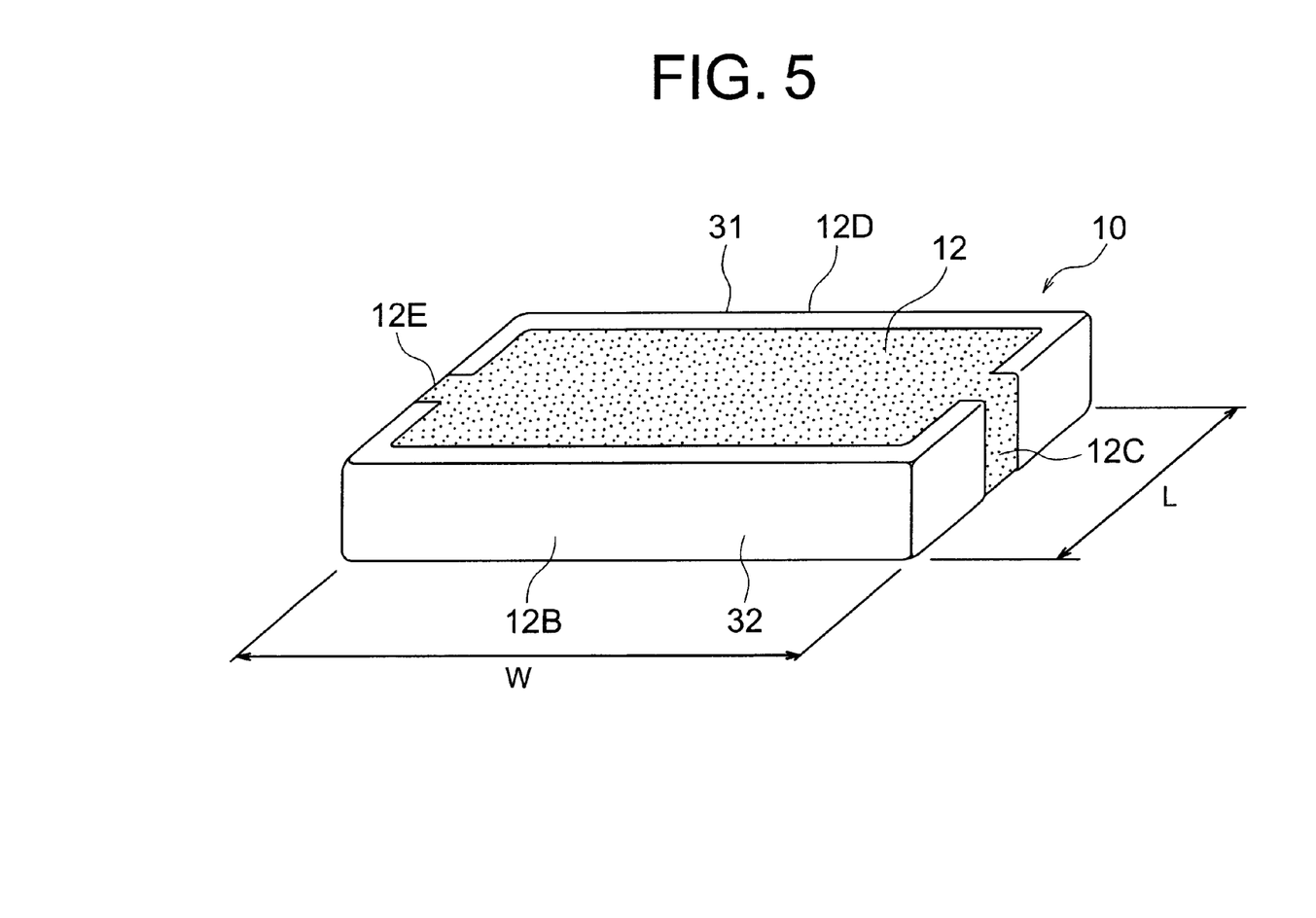
FIG. 5 is a perspective view of the multilayer capacitor shown in FIG. 4.

In the present embodiment, as shown in FIG. 4 and FIG. 5, each of the first type of internal conductors, that is, the internal electrodes 21, has a lead part 21A extending in a manner spreading to the left and right short side surfaces 12C and 12E across the long side surface 12D in the back. Further, each of the second type of internal conductors, that is, the internal electrodes 22, has a lead part 21A extending in a manner spreading to the left and right short side surfaces 12C and 12E across the long side surface 12B in the front.

Further, along with this, the terminal electrode 31 extends to the left and right short side surfaces 12C and 12E from the long side surface 12D in back, while the terminal electrode 32 extends to the left and right short side surfaces 12C and 12E from the long side surface 12B in the front.

Due to the above, according to the present embodiment, the main flow of the current is made the direction shown by the arrow Y in FIG. 4. By making this shorter than in the first embodiment, it is possible to realize a multilayer capacitor 10 further reduced in ESL.

Further, the present invention is not limited to the above embodiments and can be modified in various ways within the scope of the invention. For example, in the multilayer capacitors 10 according to the first and second embodiments, there were four each, or a total of eight, internal electrodes. In the present invention, however, the numbers of internal electrodes are not limited to these. They may be made further higher. For example, it is possible to provide tens or hundreds of layers and internal electrodes.

EXAMPLES

Next, the present invention will be explained further using specific examples, but the invention is not limited to these examples. In the examples, a network analyzer was used to convert an S-parameter to the impedance and find the ESL's of the following capacitor samples.

First, details of the capacitor samples will be explained. That is, a two-terminal type multilayer capacitor in general use as a capacitor was used as the sample 1, a conventional reduced ESL two-terminal type multilayer capacitor shown in FIG. 10 was used as the sample 2, and a two-terminal type multilayer capacitor according to the embodiment shown in FIG. 5 was used as the sample 3 and their ESL's were found.

Figure 6:
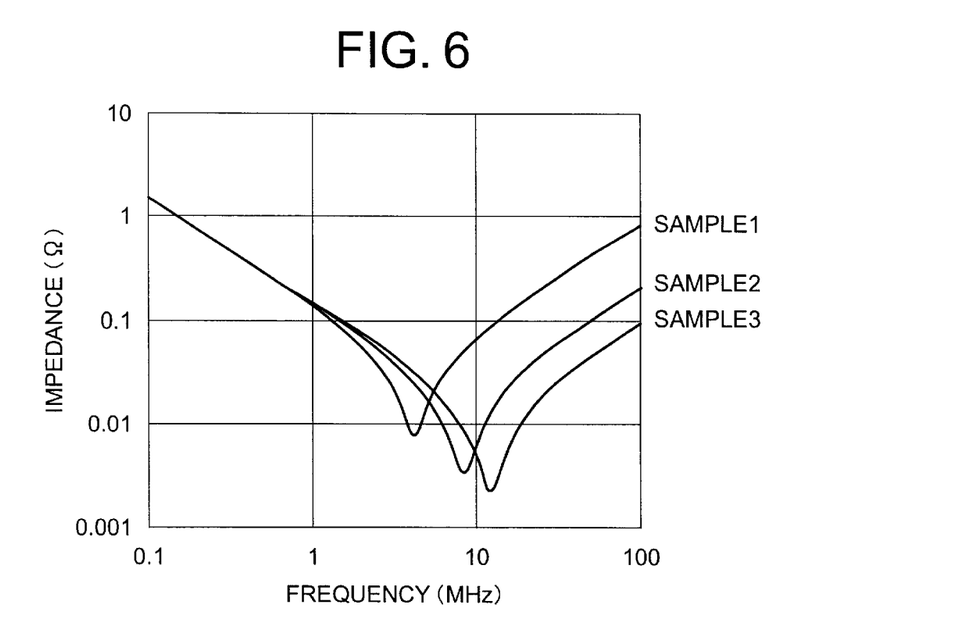
FIG. 6 is a graph of impedance characteristics of samples.

Further, as a result, the impedance characteristics of the samples were measured. The results are shown in FIG. 6. As shown in the graph of FIG. 6, it was confirmed that the minimum values of the impedance grew smaller in the order of the samples 1, 2, and 3. Further, when finding the ESL, the ESL was 1420 pH in the sample 1, the ESL was 380 pH in the sample 2, and the ESL was 172 pH in the sample 3. That is, in the sample 3 according to the embodiment of the present invention, it was confirmed that the ESL was greatly reduced.

The ESL is found from the following equation 2:

$$2\pi f_0 = 1/\sqrt{(ESL \cdot C)}$$

where,
$f_0$ is the self resonant frequency, and
C is the electrostatic capacity.

Figure 7:
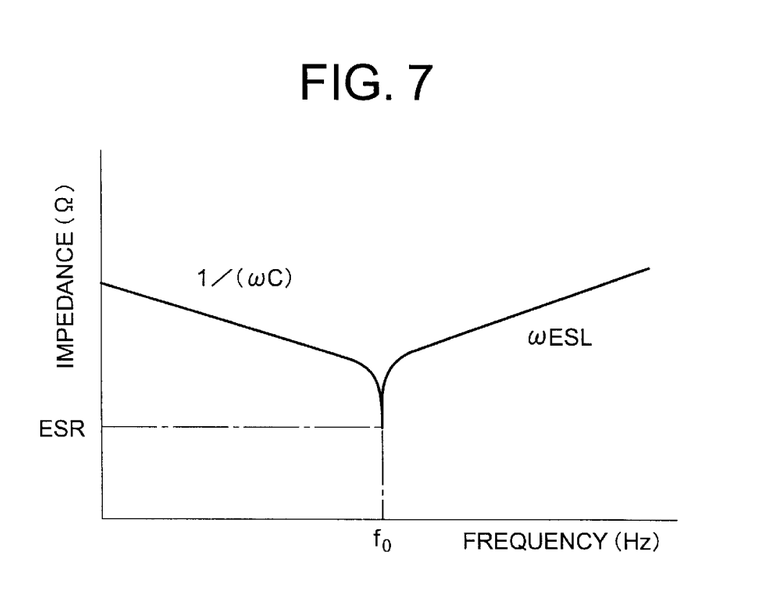
FIG. 7 is a graph of impedance characteristics of a capacitor.

The relationship with equivalent serial resistance (ESR) at the self resonant frequency $f_0$ is shown in FIG. 7.

As the dimensions of the samples used here, when making the distance between the side surfaces of the dielectric body from which the two types of internal conductors are led out the "dimension L" and making the distance between the two side surfaces orthogonal to the side surfaces of the dielectric body from which the internal conductors are led out the "dimension W", the sample 1 had a dimension L of 3.2 mm and a dimension W of 1.6 mm, while the sample 2 and sample 3 had a dimension L of 1.6 mm and a dimension W of 3.2 mm. Further, the electrostatic capacity was 1.06 $\mu$F in the sample 1, 1.01 $\mu$F in the sample 2, and 1.02 $\mu$F in the sample 3.

What is claimed is:

1. A multilayer ceramic electronic device comprising:

a dielectric body formed by stacking a plurality of dielectric sheets;

two types of internal conductors arranged inside said dielectric body sandwiched between said dielectric sheets, formed with lead parts led out straddling three side surfaces of said dielectric body, and interposed between different layers; and two terminal electrodes each arranged at an outer surface of said dielectric body straddling three side surfaces of said dielectric body, covering the lead parts led out straddling three sides to be connected to one of the two types of internal conductors, and insulated from the other, wherein the lead parts of the two types of internal conductors led out to the side surfaces of the dielectric body are arranged straddling three side surfaces of the dielectric body in a positional relationship not overlapping but almost close to each other in a center portion of the dielectric body when projected in a stacking direction of said dielectric sheets such that areas in the two type of internal conductors where current flows in reverse directions are maximized.

2. The multilayer ceramic electronic device as set forth in claim 1,
width (W1) of non-overlap of the lead parts of the two types of internal conductors is 0.3 to 0.5 mm.

3. The multilayer ceramic electronic device as set forth in claim 2, wherein said dielectric body is formed shaped as a rectangular parallelepiped.

4. The multilayer ceramic electronic device as set forth in claim 3, wherein the lead parts of the internal conductors are arranged straddling a short side surface of the rectangular parallelepiped shaped dielectric body and two long side surfaces positioned at the two sides of the short side surface.

5. The multilayer ceramic electronic device as set forth in claim 4, wherein, matching with the led out shapes of the lead parts of the internal conductors, said terminal electrodes are arranged straddling a short side surface of the parallelepiped dielectric body and the two long side surfaces positioned at the two sides of the short side surface.

6. The multilayer ceramic electronic device as set forth in claim 3, lead parts of said internal conductors are arranged straddling a long side surface of a parallelepiped dielectric body and the two short side surfaces positioned at the two sides of the long side surface.

7. The multilayer ceramic electronic device as set forth in claim 6, wherein, matching with the led out shapes of the lead parts of the internal conductors, said terminal electrodes are arranged straddling a long side surface of the parallelepiped dielectric body and the two short side surfaces positioned at the two sides of the long side surface.

8. The multilayer ceramic electronic device as set forth in claim 1, wherein each of said internal conductors has an internal conductor body portion having a shape matching an outer shape of said dielectric sheet and separated from edges of said dielectric sheet and one of the lead parts formed integrally with said internal conductor body portion on the same plane and led out straddling adjoining three side surfaces of said dielectric body.

9. The multilayer ceramic electronic device as set forth in claim 1, wherein pluralities of the two types of internal conductors are arranged in said dielectric body.

10. The multilayer ceramic electronic device as set forth in claim 9, wherein the two types of internal conductors are alternately arranged in said dielectric body.

11. A multilayer ceramic electronic device comprising:

a dielectric body formed by stacking a plurality of dielectric sheets;

two types of internal conductors arranged inside said dielectric body sandwiched between said dielectric sheets, formed with lead parts led out straddling three side surfaces of said dielectric body, and interposed between different layers; and two terminal electrodes each arranged at an outer surface of said dielectric body straddling three side surfaces of said dielectric body, covering the lead parts led out straddling three sides to be connected to one of the two types of internal conductors, and insulated from the other, wherein the two terminal electrodes and two types of internal conductors straddling the three side surfaces of the dielectric body are connected in order that there are locations in the two types of internal conductors where current flows in reverse directions.

* * * * *